US008827086B2

(12) United States Patent
Ansorge et al.

(10) Patent No.: US 8,827,086 B2
(45) Date of Patent: Sep. 9, 2014

(54) ULTRAFILTRATION MEMBRANE

(75) Inventors: Wolfgang Ansorge, Essen (DE); Ernst Spindler, Kleinheubach (DE); Richard Krüger, Wuppertal (DE); Martin Rütering, Wuppertal (DE); Oliver Schuster, Gevelsberg (DE)

(73) Assignee: Membrana GmbH, Wuppertal (DE)

( * ) Notice: Subject to any disclaimer, the term of this patent is extended or adjusted under 35 U.S.C. 154(b) by 1378 days.

(21) Appl. No.: 12/299,631

(22) PCT Filed: May 3, 2007

(86) PCT No.: PCT/EP2007/003897
§ 371 (c)(1),
(2), (4) Date: Dec. 22, 2008

(87) PCT Pub. No.: WO2007/128488
PCT Pub. Date: Nov. 15, 2007

(65) Prior Publication Data
US 2010/0224553 A1    Sep. 9, 2010

(30) Foreign Application Priority Data
May 6, 2006    (DE) .......................... 10 2006 021 217

(51) Int. Cl.
*B01D 69/08*    (2006.01)
*B01D 71/68*    (2006.01)
*B01D 61/14*    (2006.01)
*B01D 67/00*    (2006.01)
*C02F 1/44*    (2006.01)

(52) U.S. Cl.
CPC .......... *B01D 61/145* (2013.01); *B01D 2325/04* (2013.01); *B01D 69/081* (2013.01); *B01D 67/0011* (2013.01); *B01D 67/0016* (2013.01); *B01D 69/087* (2013.01); *B01D 71/68* (2013.01); *B01D 2325/02* (2013.01); *B01D 2325/022* (2013.01); *B01D 2325/026* (2013.01); *B01D 2325/20* (2013.01); *B01D 2325/24* (2013.01); *B01D 2325/36* (2013.01)
USPC ............. 210/500.23; 210/500.41; 210/500.21

(58) Field of Classification Search
USPC .................. 210/483, 500.21, 500.23, 500.41
See application file for complete search history.

(56) References Cited

U.S. PATENT DOCUMENTS

| 4,317,729 A | * | 3/1982 | Yamashita et al. ........ 210/500.23 |
| 4,399,035 A | * | 8/1983 | Nohmi et al. ............. 210/500.23 |
| 4,933,081 A | | 6/1990 | Sasaki et al. |

(Continued)

FOREIGN PATENT DOCUMENTS

DE    19518624 C1    11/1996
EP    0361085 A1    4/1990
(Continued)

OTHER PUBLICATIONS

BASF, "Product Information: Ultrason(R) E 6020 P", Jul. 2004, pp. 1-2.*

*Primary Examiner* — Katherine Zalasky
(74) *Attorney, Agent, or Firm* — Hammer & Associates, P.C.

(57) ABSTRACT

The invention relates to a hollow-fiber membrane for ultrafiltration made from a hydrophobic aromatic sulfone polymer and at least one hydrophilic polymer, the membrane having an open-pore separating layer on the lumen side, an adjoining supporting layer with asymmetric, sponge-like pore structure without finger pores and an outer layer adjoining the supporting layer towards the outer surface. The separating layer has a cutoff between 20 000 and 200 000 daltons, a thickness of max. 10% of the membrane thickness and an essentially isotropic pore structure. The size of the pores in the supporting layer initially increases up to a zone with maximum pore size, and then decreases towards the outer layer, and the outer layer exhibits a thickness of 10 to 30% of the wall thickness and an essentially isotropic pore structure. The mean size of the pores in the outer layer is larger than in the separating layer, but smaller than in the supporting layer. The wall thickness of the hollow-fiber membrane lies in the range from 100 to 450 μm. The invention relates furthermore to a method for the production of these hollow-fiber membranes.

25 Claims, 1 Drawing Sheet

(56) References Cited

U.S. PATENT DOCUMENTS

Figure 1:
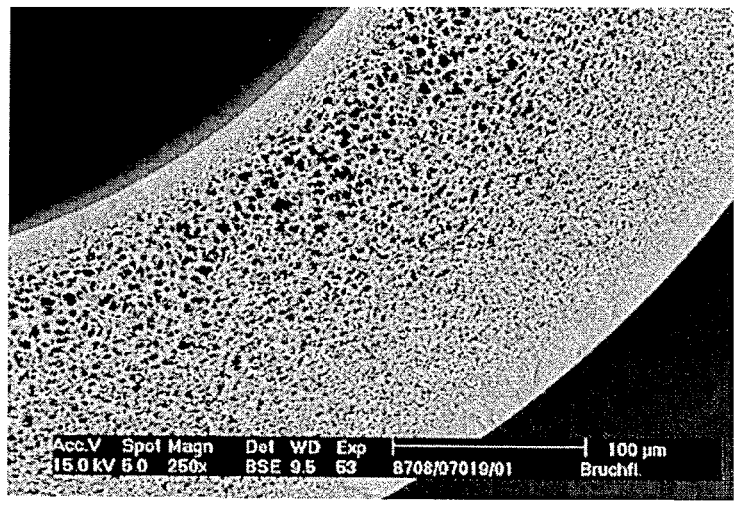

| | | |
|---|---|---|
| 5,049,276 A | 9/1991 | Sasaki |
| 5,886,059 A | 3/1999 | Wang |
| 5,919,370 A * | 7/1999 | Rottger et al. ............ 210/646 |
| 5,928,774 A | 7/1999 | Wang et al. |
| 7,644,825 B2 * | 1/2010 | Krause et al. ............ 210/500.22 |
| 2005/0121384 A1 * | 6/2005 | Gorsuch et al. ............ 210/500.23 |
| 2007/0080108 A1 * | 4/2007 | Kuroda et al. ............ 210/500.23 |

FOREIGN PATENT DOCUMENTS

| | | |
|---|---|---|
| EP | 0568045 A1 | 3/1993 |
| EP | 828553 A1 | 11/1996 |
| JP | WO 2005/046763 * | 5/2005 |
| WO | WO 2004/056460 A1 | 7/2004 |

* cited by examiner

ULTRAFILTRATION MEMBRANE

The present invention relates to a hydrophilic, integrally asymmetric, semi-permeable hollow-fibre membrane for ultrafiltration made from a hydrophobic aromatic sulfone polymer and at least one hydrophilic polymer, as well as a method for its production.

Polymer membranes are employed in a very wide range of different industrial, pharmaceutical or medical applications for precision filtration. In these applications, membrane separation processes are gaining in importance, as these processes offer the advantage that the substances to be separated are not thermally burdened or even damaged. Ultrafiltration membranes can be employed for the removal or separation of macromolecules. Numerous further applications of membrane separation processes are known from the beverages industry, biotechnology, water treatment or sewage technology. Such membranes are generally classified according to their retention capacity, i.e. according to their capacity for retaining particles or molecules of a certain size, or with respect to the size of the effective pores, i.e. the size of the pores that determine the separation behaviour. Ultrafiltration membranes thereby cover the size range of the pores determining the separation behaviour between roughly 0.01 and approx. 0.1 µm, so that particles or molecules with a size in the range larger than 20 000 or larger than approx. 200 000 daltons can be retained.

A further distinction between the membranes can be made with respect to the pore structure of the membranes, i.e. with respect to the size of the pores over the membrane wall. Here a distinction can be made between symmetric membranes, i.e. membranes in which the pore size on both sides of the membrane wall is essentially the same, and asymmetric membranes in which the pore size on the two sides of the membrane is different. Asymmetric membranes generally have a separating layer with a minimal pore size that determines the separation characteristics of the membrane, and adjoining the separating layer a supporting layer with coarser pores that is responsible for the mechanical stability of the membrane. An integrally asymmetric membrane is understood to be one having at least one separating layer and one supporting layer, the separating and supporting layers consisting of the same material and being formed simultaneously during the production of the membrane. As a result, both layers are bound together as an integral unit. At the transition from the separating layer to the supporting layer there is merely a change with respect to the membrane structure. Integrally asymmetric membranes and methods for their production are described e.g. in EP 0361 085 B1.

In contrast to integrally asymmetric membranes, composite membranes have a multilayer structure resulting from the fact that a separating layer is applied to a previously produced (micro)porous supporting layer or supporting membrane in a subsequent, i.e. separate, process step such as coating with a film-forming polymer, or grafting with a monomer forming this polymer. As a result, the materials forming the supporting layer and the separating layer in composite membranes also have different properties. At the transition from the separating layer to the supporting layer there is therefore an inhomogeneity with respect to the material forming the membrane in composite membranes.

In order to be able to perform ultrafiltration applications cost-effectively, membranes are required that exhibit high filtration rates. In order to achieve these high filtration capacities, the membranes are generally subjected to high pressures. An essential criterion for the evaluation of the membranes is therefore their permeability or transmembrane flow, with the permeability being defined as the volume of fluid passing through the membrane per unit of area of the membrane, and per unit of time and pressure. In addition, the mechanical strength or stability of the hollow fibre membrane is an important evaluation criterion.

In many cases, membranes made from sulfone polymers such as polysulfone or polyether sulfone are employed for applications in the ultrafiltration sector, not least due to their high chemical stability towards i.a. acids or alkalis, their temperature stability or the sterilisability of the membranes made from these materials.

U.S. Pat. No. 5,928,774 discloses asymmetric ultrafiltration membranes made from sulfone polymers in the form of flat films. The membranes in U.S. Pat. No. 5,928,774 exhibit a pronounced asymmetry; on their one surface they have a separating layer in the form of a skin, and adjoining this a supporting layer whose pore structure is free from caverns, also known as finger pores or macrovoids, and whose pores gradually become larger starting from the skin towards the second surface. With their pronounced asymmetry, the membranes in U.S. Pat. No. 5,928,774 are optimised towards high transmembrane flows and high dirt-loading capacity in the application. Similar flat membranes with pronounced asymmetry made from a polyether sulfone are also described in U.S. Pat. No. 5,886,059.

As the semi-permeable membranes described in the publications cited above are made from hydrophobic sulfone polymers, they have poor water wettability so that their use is very limited for the filtration of aqueous media. Furthermore it is known that hydrophobic membranes have a strong, non-specific ability to adsorb e.g. proteins, so that a rapid coating of the membrane surface with predominantly higher molecular constituents from the liquid to be filtered frequently occurs during use, consequently resulting in a deterioration in the permeability. In order to improve the water wettability and hence improve the permeability to aqueous media, various attempts have been made to make membranes based on sulfone polymers hydrophilic, while at the same time reducing the tendency to adsorb proteins. According to one of these approaches, hydrophilic polymers such as polyvinylpyrrolidone are admixed to the sulfone polymers.

EP-A-568 045 relates to hydrophilic polysulfone-based hollow-fibre membranes with an asymmetric structure that contain a polyglycol and a vinylpyrrolidone-based polymer to ensure the hydrophilic properties. On their side facing towards the lumen, the hollow-fibre membranes in EP-A-568 045 have a 0.1 to 3 µm thick separating layer with slot-like, 0.001 to 0.05 wide pores on the inner surface. This separating layer is adjoined by a supporting layer with network- or sponge-like structure and pores with a mean size of 1 to 5 µm. On the outer surface is a layer with a network- or sponge-like structure that is denser than the supporting layer.

The cutoffs of the membranes in EP-A-568 045 can be assigned to the ultra-filtration range, although the membranes are optimised for blood treatment. Permeabilities for water in the order of up to approx. 0.7 ml/cm$^2$·min·bar are cited for the hollow-fibre membranes in the examples given in EP-A-568 045. These membranes have a wall thickness of 40 µm, however, and are therefore relatively thin-walled and hence not suitable for ultrafiltration applications due to their insufficient pressure and breakage stability.

EP-A-828 553 discloses hollow-fibre membranes i.a. of polyether sulfone predominantly for the nanofiltration range and lower ultrafiltration range, i.e. for applications in particular for haemodialysis, haemodiafiltration and haemofiltration. The hollow-fibre membranes in EP-A-828 553 have a three-layer structure with a thin separating layer exhibiting open pores on the lumen side of the hollow-fibre membrane, an adjoining coarse-pored sponge-like or network-like supporting layer with homogeneous structure without finger pores and a subsequent outer layer whose pore size is larger than that of the separating layer, but smaller than that of the supporting layer. The membranes disclosed in the examples in EP-A-828 553 are essentially dialysis membranes whose permeability and transmembrane flows are too low and/or whose mechanical strength is insufficient for ultrafiltration applications due to the low membrane thicknesses.

The object of the present invention is therefore to provide an improved hollow-fibre membrane for ultrafiltration that exhibits a high permeability with simultaneous high mechanical stability. A further object of the present invention is to provide a method for the production of such hollow-fibre membranes.

The object of the invention is achieved with a hydrophilic, integrally asymmetric, semi-permeable hollow-fibre membrane for ultrafiltration made from a hydrophobic aromatic sulfone polymer and at least one hydrophilic polymer, the membrane exhibiting an inner surface facing towards its lumen, an outer surface facing outwards and an intermediate wall with a wall thickness, whereby in its wall on the inner surface the hollow-fibre membrane has an open-pore separating layer, adjoining the separating layer towards the outer surface a subsequent supporting layer with asymmetric, sponge-like pore structure without finger pores and an outer layer adjoining the supporting layer towards the outer surface, the hollow-fibre membrane according to the invention being characterised in that the separating layer has a cutoff in the range between 20 000 and 200 000 daltons and a thickness of max. 10% of the wall thickness, that the pore structure in the area of the separating layer is essentially isotropic, that the size of the pores in the supporting layer initially increases from the separating layer up to a zone with maximum pore size, then decreases beyond this zone towards the outer layer, that the outer layer has a thickness of 10 to 30% of the wall thickness, that the pore structure in the area of the outer layer is essentially isotropic and the mean size of the pores in the outer layer is larger than the mean pore size in the separating layer, but smaller than the mean pore size in the supporting layer, the wall thickness lying in the range from 100 to 450 µm, and that it exhibits a transmembrane flow for water of at least 0.5 ml/(cm²·min·bar) and a breaking strength $\sigma_B$, i.e. a breaking force BK referred to the cross-sectional area $A_Q$ of its wall of at least 300 cN/mm².

The combination of characteristics according to the invention surprisingly produces a hollow-fibre membrane that has both a high permeability for water, i.e. a high transmembrane flow for water, and a high mechanical load-bearing capacity. The breaking force of the hollow-fibre membrane is taken here to evaluate the mechanical load-bearing capacity or stability. Further evaluation criteria are the breaking strength of the hollow-fibre membrane and its bursting pressure on exposure to internal pressure.

The fact that the hollow-fibre membranes according to the invention have a high permeability for water and at the same time a high mechanical load-bearing capacity surprises all the more, since these characteristics exhibit opposing trends: The permeability of membranes increases with decreasing wall thickness of the membranes and/or a more coarse-pored structure of the pore system of the membrane. Lesser wall thicknesses and coarser-pored structures result, however, in a reduction in the mechanical stability of the membranes. On the other hand, the strength of a membrane increases, the denser the pore structure, i.e. the smaller the pores in the membrane are. The mechanical stability of a membrane also increases with increasing wall thickness. These two factors, however, result in a reduction in the membrane permeability.

The object of the invention is furthermore achieved with a method for production of such a hollow-fibre membrane. This method comprises the steps:

a. Production of a homogeneous spinning solution comprising a polymer component and a solvent system, whereby the polymer component comprises 17 to 27 wt. %, referred to the weight of the solution, of a hydrophobic aromatic sulfone polymer and 10 to 30 wt. %, referred to the weight of the solution, of at least one hydrophilic polymer, while the solvent system consists of 5 to 80 wt. %, referred to the weight of the solvent system, of a solvent for the polymer component, 0 to 80 wt. %, referred to the weight of the solvent system, of a latent solvent for the polymer component and 0 to 70 wt %, referred to the weight of the solvent system, of a non-solvent for the polymer component, b. Extrusion of the homogeneous spinning solution through the annular gap of a hollow-fibre die to produce a hollow fibre, c. Extrusion of an interior filler through the central opening of the hollow-fibre die, said interior filler consisting of a mixture of a solvent and a non-solvent for the sulfone polymer, d. Bringing of the interior filler into contact with the inside of the hollow fibre to initiate the coagulation inside the hollow fibre and to form a separating layer on the inside of the hollow fibre and the membrane structure, e. Passage of the hollow fibre after leaving the hollow-fibre die for a period of 0.5 to 10 s through a climate-controlled zone containing air with a relative humidity of 40 to 95% and a temperature of 50 to 70° C., subsequently f. Passage of the hollow fibre through an aqueous coagulation medium conditioned to 50 to 80° C. to complete the formation of the membrane structure and to fix the membrane structure, g. Extraction of the hollow-fibre membrane formed in this way to remove the solvent system and soluble substances, h. Drying of the hollow-fibre membrane.

Due to the special architecture and pore structure of the membrane according to the invention, i.e. particularly due to the coarse-pored, sponge-like supporting layer that extends over at least 60% of the wall thickness, and the adjoining outer layer accounting for 10 to 30% of the wall thickness with an essentially isotropic pore structure and a mean pore size that is larger than the mean pore size in the separating layer, but smaller than the mean pore size in the supporting layer, both a high permeability and a high mechanical load-bearing capacity are achieved. With thicknesses of the outer layer of less than 10% of the wall thickness, an undesirable reduction in the mechanical load-bearing strength is achieved. Although thicknesses of the outer layer of more than 30% of the wall thickness result in good mechanical properties, a significant reduction in the permeability is observed. The outer layer preferably extends over not more than 25% of the wall thickness, and most preferably over 15 to 25% of the wall thickness.

When observing the outer surface of the hollow-fibre membrane according to the invention it is possible that the pore size on the surface appears smaller than in the underlying isotropic outer layer. In such cases the membrane according to the invention exhibits a max. 5 µm thick skin on this surface, or has a thin, up to approx. 5 µm thick layer between the outer layer and the outer surface of the membrane, within which layer the pore size decreases from the mean pore size in the outer layer to the pore size in the surface.

The separation efficiency of the membrane according to the invention thereby results from the size of the pores in the separating layer. The permeability of the membrane is essentially determined by the separating layer and the outer layer, whereby a significant influence can be exerted on the permeability by modifying the pore size in the outer layer. The presence of the separating layer and the outer layer in the hollow-fibre membrane according to the invention results at the same time in separation characteristics and permeability being essentially decoupled from one another, so that an increase in the permeability does not simultaneously result in a shift in the cutoff to larger molecules or particles. On the other hand, a shift in the cutoff to smaller molecule or particle sizes does not significantly reduce the permeability.

The supporting layer exhibits a hydraulic resistance to the transmembrane flow of water that is significantly subordinate to that of the separating layer and the outer layer and decreases, the larger the pores in the supporting layer are. The mechanical load-bearing capacity of the membrane according to the invention, i.e. the breaking strength and the pressure stability, is essentially determined by the contributions of the supporting layer and the outer layer. The major contribution to the mechanical stability of the hollow-fibre membrane according to the invention, however, is provided by the outer layer accounting for 10 to 30% of the wall thickness with an essentially isotropic pore structure whose mean pore size is larger than the mean pore size in the separating layer, but smaller than the mean pore size in the supporting layer.

In view of the pore structure of the hollow-fibre membranes according to the invention and the associated membrane properties it is an advantage if the zone of maximum pore size is located at a distance from the inner surface in the range between 15 and 40% of the wall thickness. The size of the maximum pores in the zone of maximum pore size preferably lies in the range between 5 and 15 µm. This creates a relatively coarse-pored structure in the supporting layer and consequently an essentially negligible contribution of the supporting layer to the flow resistance of the membrane wall. At the same time, however, the supporting layer continues to make a significant contribution to the mechanical stability of the hollow-fibre membranes according to the invention due to its homogeneous pore structure, i.e. due to its sponge-like or network-like pore structure without finger pores, frequently also referred to in the literature as caverns or macrovoids.

Within the context of the present invention, an essentially isotropic area is hereby understood as an area of the membrane wall with an essentially constant pore size. The isotropic area can also be regarded as an area with flow channels with essentially constant mean diameter extending through the membrane wall. As with every membrane, the actual pore size varies slightly also in the hollow-fibre membrane according to the invention, i.e. it exhibits a certain pore size distribution, even if the pore size distribution appears visually isotropic. The invention therefore also covers embodiments of the essentially isotropic area in which the pore size changes by max. approx. 20-30%.

The pore structure and the pore sizes over the wall thickness can be evaluated with sufficient quality by means of conventional examination methods, such as using scanning or transmission electron micrographs with a magnification of 400:1, preferably with a magnification of 750:1.

According to the invention, the separating layer also has an essentially isotropic pore structure. The pore structure of the membrane according to the invention thus differs from the pore structure of the membranes disclosed in U.S. Pat. No. 4,933,081 or U.S. Pat. No. 5,049,276 whose pore structure exhibits a gradient extending from the surface, and in which extending from the surface the pore size first decreases up to a layer with minimum pore size before the pore size then increases to the other surface. With these prior-art membranes, the separating layer with minimum pore size thus lies within the membrane wall.

In order to ensure an adequate and stable filtration capacity in the application, the hollow-fibre membrane according to the invention has a transmembrane flow of at least 0.5 ml/(cm$^2$·min·bar). The transmembrane flow is preferably max. 2.0 ml/(cm$^2$·min·bar), as a decrease in the stability under mechanical load is to be observed for the membranes according to the invention at higher transmembrane flows. Particularly preferably the hollow-fibre membrane according to the invention has a transmembrane flow in the range of 0.6 to 1.5 ml/(cm$^2$·min·bar). Such membranes have a balanced range of properties with respect to their permeability and mechanical stability. Particularly suitable are hollow-fibre membranes according to the invention with a transmembrane flow in the range of 0.8 to 1.4 ml/(cm$^2$·min·bar).

Preferred hollow-fibre membranes according to the invention are also such with a breaking strength $\sigma_B$, i.e. a breaking force BK referred to the cross-sectional area $A_Q$ of its wall of at least 500 cN/mm$^2$. Such membranes exhibit sufficiently high mechanical stabilities for ultrafiltration applications. A breaking strength $\sigma_B$ of at least 700 cN/mm$^2$ is particularly preferred. Hollow-fibre membranes with a breaking strength of at least 750 cN/mm$^2$ are most suitable. In order to ensure a sufficient stability for pressure loads from inside during the flow through the hollow-fibre membranes according to the invention from the inside to the outside, these preferably have a bursting pressure under internal pressure loading of at least 10 bar. Particularly favourable are hollow-fibre membranes with a bursting pressure of at least 13 bar.

According to the present invention, hollow-fibre membranes for ultrafiltration are provided for the first time that exhibit a high permeability and a high mechanical stability at the same time, whereby this outstanding characteristic of the hollow-fibre membranes according to the invention is attributable to their particular structure or architecture. In a preferred embodiment, the product TMF·BK of the transmembrane flow TMF for water and the breaking force BK of the hollow-fibre membrane according to the invention is greater than 400 cN·ml/(cm$^2$·min·bar). Hollow-fibre membranes for which the product TMF·BK is greater than 500 cN·ml/(cm$^2$·min·bar) are particularly preferred.

According to the invention, the wall thickness of the hollow-fibre membranes according to the invention lies in the range from 100 to 450 µm. The necessary mechanical stabilities can generally no longer be assured below a wall thickness of 100 µm, while with wall thicknesses above 450 µm the achievable transmembrane flows decrease significantly. It is an advantage if the hollow-fibre membranes according to the invention have a wall thickness in the range from 150 to 350 µm, and particularly advantageous if the wall thickness lies in the range from 180 to 250 µm. In order to achieve a good flow through the lumina of the hollow-fibre membranes in the application, particularly a favourable pressure drop, the inside diameter of the hollow-fibre membranes according to the invention preferably lies in the range from 500 to 1500 µm, and especially preferably in the range from 650 to 1200 µm.

In order to ensure an adequate permeability, the porosity of the hollow-fibre membranes according to the invention preferably lies above 60 vol. %. On the other hand, excessively high volume porosities are a disadvantage due to the loss of mechanical stability, so that the porosity generally lies preferably below 90 vol. %. The hollow-fibre membranes according to the invention especially preferably have a volume porosity in the range of 70 to 85 vol. %.

The hollow-fibre membranes according to the invention should be suitable for use in applications in the field of ultrafiltration. The separation behaviour of the hollow-fibre membrane is hereby determined by the separating layer that lies on the side of the membrane wall facing towards the lumen. As already described, ultrafiltration membranes cover cutoffs with respect to the retention of particles or molecules in the range between 20 000 and 200 000 daltons due to the size of the pores in the separating layer, which determine the separation behaviour. In a preferred embodiment, the hollow-fibre membrane according to the invention has a cutoff in the range between 50 000 and 150 000 daltons. The cutoff lies especially preferably between 65 000 and 120 000 daltons.

The cutoff is thereby determined from the retention capacity of the membrane for dextran molecules of different molar mass. The membrane to be characterised is thereby overflowed in cross-flow mode by a polydisperse aqueous dextran solution (pool). The sieving coefficients for dextran molecules of different molar mass are determined from the percentage of dextran molecules of different molar mass in the filtrate stream and in the pool. The cutoff is defined as the molar mass for which a sieving coefficient of 0.1 or a retention of 90% is obtained.

The membranes according to the invention are produced from a homogeneous spinning solution of the polymer component and the solvent system. The polymer component thereby comprises a hydrophobic aromatic sulfone polymer and at least one hydrophilic polymer. According to the invention, the concentration of the sulfone polymer in the spinning solution is 17 to 27 wt. %. Below a concentration of 17 wt. %, disadvantages arise in particular with respect to the mechanical stability of the hollow-fibre membranes obtained. On the other hand, membranes obtained from spinning solutions with more than 27 wt. % of the sulfone polymer exhibit an excessively dense structure and insufficient permeability. The spinning solution preferably contains 20 to 25 wt. % of the hydrophobic aromatic sulfone polymer. The sulfone polymer can also contain additives such as antioxidants, nucleating agents, UV absorbers, etc. to selectively modify the properties of the membranes.

Advantageous hydrophobic aromatic sulfone polymers from which the membrane according to the invention is composed or which are employed in the method according to the invention are polysulfone, polyether sulfone, polyphenylene sulfone or polyaryl ether sulfone. In a particularly preferred embodiment the hydrophobic aromatic sulfone polymer is a polysulfone or a polyether sulfone with the repeating molecular units shown in the following formulae (I) and (II):

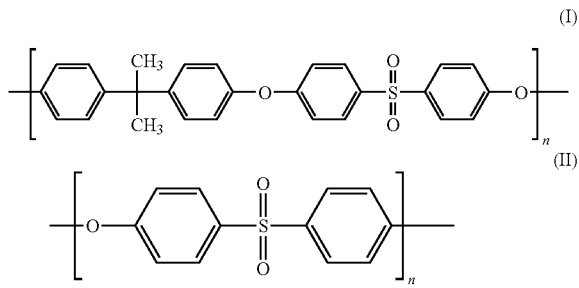

Long-chain polymers are advantageously employed as the at least one hydrophilic polymer that on the one hand exhibit a compatibility with the hydrophobic aromatic sulfone polymer and have repeating polymer units that in themselves are hydrophilic. A hydrophilic polymer with a mean molecular weight $M_W$ of at least 10 000 daltons is preferably employed. The hydrophilic polymer is preferably poly-vinylpyrrolidone, polyethylene glycol, polyvinyl alcohol, polyglycol monoester, a polysorbitate such as polyoxyethylene sorbitan monooleate, carboxymethyl-cellulose or a modification or copolymer of these polymers. Polyvinylpyrrolidone and polyethylene glycol are particularly preferred.

Within the context of the present invention, the at least one hydrophilic polymer can also comprise mixtures of different hydrophilic polymers. The hydrophilic polymer can, for example, be a mixture of chemically different hydrophilic polymers or of hydrophilic polymers with different molecular weights, e.g. a mixture of polymers whose molecular weight differs by a factor of 5 or more. In a preferred embodiment, the at least one hydrophilic polymer comprises a mixture of polyvinylpyrrolidone or polyethylene glycol with a hydrophilically modified aromatic sulfone polymer. In a particularly preferred embodiment the hydrophilically modified aromatic sulfone polymer is a sulfonated aromatic sulfone polymer, in particular a sulfonated modification of the hydrophobic aromatic sulfone polymer employed in the membrane according to the invention and in the method according to the invention. Mixtures of polyether sulfone, sulfonated polyether sulfone and polyvinylpyrrolidone can be particularly advantageously employed for the hollow-fibre membranes according to the invention and for the method according to the invention. As a result of the presence of a hydrophilically modified aromatic sulfone polymer, hollow-fibre membranes with particularly stable hydro-philic properties in the application are obtained.

A large proportion of the at least one hydrophilic polymer is washed out of the membrane structure during production of the hollow-fibre membrane according to the invention. In view of the demanded hydrophilic properties of the hollow-fibre membranes according to the invention and their wettability, however, it is necessary for a certain proportion of the at least one hydrophilic polymer to remain in the membrane. The finished hollow-fibre membrane therefore contains the at least one hydrophilic polymer preferably in a concentration in the range between 1 and 15 wt. %, and particularly preferably between 3 and 10 wt. %, referred to the weight of the finished hollow-fibre membrane. Furthermore the hydrophilic polymer can also be chemically or physically modified in the finished membrane. For example, polyvinylpyrrolidone can subsequently be made insoluble in water by cross-linking.

The solvent system to be employed must be matched to the hydrophobic aromatic sulfone polymer employed and to the at least one hydrophilic polymer so that a homogeneous spinning solution can be produced. The solvent system preferably comprises polar, aprotic solvents such as dimethylformamide, dimethylacetamide, dimethyl sulfoxide, N-methylpyrrolidone or their mixtures, or protic solvents such as ε-caprolactam. Furthermore, the solvent system can contain up to 80 wt. % latent solvent, whereby in the context of the present invention a latent solvent is understood as a solvent that poorly dissolves the sulfone polymer or dissolves it only at elevated temperature. In cases where a-caprolactam is used as a solvent, γ-butyrolactone, propylene carbonate or polyalkylene glycol can be employed, for example. In addition, the solvent system can contain non-solvents for the membrane-forming polymer such as water, glycerine, low-molecular polyethylene glycols with a mean molecular weight of less than 1000 daltons or low-molecular alcohols such as ethanol or isopropanol. In a preferred embodiment of the method according to the invention, the solvent system contains ε-caprolactam as a solvent. In this case a solvent system is particularly preferred that contains 35 to 50 wt. % ε-caprolactam referred to the weight of the solvent system, 35 to 50 wt. % γ-butyrolactone referred to the weight of the solvent system, and 0 to 10 wt. % non-solvent for the polymer component referred to the weight of the solvent system.

After degassing and filtration to remove undissolved particles, the homogeneous spinning solution is extruded through the annular gap of a conventional hollow-fibre die to produce a hollow fibre. An interior filler that is a coagulation medium for the hydrophobic aromatic sulfone polymer and at the same time stabilises the lumen of the hollow fibre is extruded through the central nozzle opening arranged coaxially to the annular gap in the hollow-fibre die. The width of the annular gap and the inside diameter of the central nozzle opening are selected according to the desired wall thickness of the hollow-fibre membrane according to the invention.

The width of the annular gap preferably lies in the range between 100 and 500 μm. For the production of hollow-fibre membranes according to the invention with preferred wall thickness in the range from 150 to 350 μm, the gap width lies advantageously in the range between 150 and 400 μm. The inside diameter of the central nozzle opening lies preferably in the range from 400 to 1500 μm, and particularly preferably in the range from 500 to 1200 μm.

It should be noted that the process conditions according to the invention described above and below result in the membrane structure demanded for the hollow-fibre membranes according to the invention as long as the wall thickness of the hollow-fibre membranes obtained lies in the range demanded for the hollow-fibre membranes according to the invention, i.e. in the range from 100 to 450 μm. It has been found, for example, that the same process conditions for the production of thin-walled hollow-fibre membranes, e.g. of membranes with a wall thickness of approx. 30 μm, result in a structure in the membrane wall that deviates from that of the membranes according to the invention.

The interior filler, i.e. the inner coagulation medium, consists of one of the above-mentioned solvents, preferably of one of the solvents also employed in the solvent system of the spinning solution, and necessarily a non-solvent. This non-solvent is intended to trigger the coagulation of the hydrophobic aromatic sulfone polymer, but can dissolve the at least one hydrophilic polymer. Insofar as a non-solvent is contained in the solvent system, then the non-solvent contained in the interior filler can be the same non-solvent, whereby the non-solvent concentration in the interior filler is naturally higher than that in the solvent system in order to achieve a sufficient precipitation effect. A different non-solvent can, however, also be used for the interior filler than for the solvent system. The non-solvent employed can also be composed of several different non-solvent components. In the preferred case of the use of ε-caprolactam as a solvent, a mixture of glycerine and ε-caprolactam is preferably employed as the interior filler.

Essential to the invention for the formation of the hollow-fibre membrane according to the invention is that after leaving the hollow-fibre die and before entering the coagulation medium, the hollow fibre passes through a climate-controlled zone with defined climatic conditions. The climate-controlled zone can thereby take the form of e.g. an encapsulated chamber. For technical reasons it may be necessary for an air gap to exist between the hollow-fibre die and the climate-controlled zone. This gap should, however, advantageously be as small as possible; the climate-controlled zone preferably directly follows the hollow-fibre die.

According to the invention, the hollow fibre has a retention time in the climate-controlled zone of 0.5 to 10 s, whereby the climate-controlled zone contains air with a relative humidity of 40 to 95% and a temperature of 50 to 70° C. The air contained in the climate-controlled zone preferably has a relative humidity of 55 to 85%. In an also preferred embodiment of the method according to the invention, the retention time of the hollow fibre in the climate-controlled zone is 1 to 5 s. In order to establish stable conditions in the climate-controlled zone, the air preferably flows through the climate-controlled zone with a velocity of less than 0.5 m/s and particularly preferably with a velocity in the range from 0.15 to 0.35 m/s.

As the hollow fibre is directed through the climate-controlled zone set to the climatic conditions demanded by the invention, a precoagulation of the hollow fibre is induced by absorption on the outside of the hollow fibre of the air moisture acting as the non-solvent. Simultaneously, the retention time must be set within the range demanded by the invention. These measures have a crucial influence on the formation of the outer layer of the hollow-fibre membrane according to the invention so that the outer layer obtains an essentially isotropic structure.

After passing through the climate-controlled zone, the precoagulated hollow fibre is directed through an aqueous coagulation medium conditioned to 50 to 80° C. in order to complete the formation of the membrane structure and fix the membrane structure. The coagulation medium is preferably conditioned to a temperature in the range from 60 to 75° C. In a preferred embodiment of the method according to the invention, the coagulation medium is water or a water bath.

In the coagulation medium, the membrane structure is first precipitated to such an extent that it already has sufficient stability and can be diverted over e.g. deflection rollers or similar means in the coagulation medium. During the further course of the process, the coagulation is completed and the membrane structure stabilised. An extraction of the solvent system and soluble substances takes place here at the same time. In general, a large proportion of the hydrophilic polymer, e.g. of the polyvinylpyrrolidone, is extracted from the membrane structure, so that the coagulation baths serve at the same time as washing or extraction baths. Water is preferably employed as a coagulation or washing medium in these coagulation or washing baths.

After extraction, the hollow-fibre membrane thus obtained is dried and the dried membrane is then coiled. During extraction and drying of the membrane, a slight drawing may be advantageous in order to selectively set certain membrane properties, such as the surface porosity and the separation characteristics. The hollow-fibre membrane according to the invention can subsequently be texturised if necessary to improve the exchange properties of the hollow-fibre membrane in the bundle. Finally the hollow-fibre membrane can be processed using conventional methods, e.g. wound onto a coil or formed directly into bundles with a suitable fibre count and length. Before production of the bundles, supplementary threads, e.g. in the form of multifilament yarns, can be added to the hollow-fibre membranes in order to thus ensure a spacing of the hollow-fibre membranes relative to one another and a better flow around the individual hollow-fibre membranes in the bundle.

The invention is explained in further detail by reference to the examples and figures described below, whereby the scope of the invention is not limited by the examples.

FIG. 1: is a scanning electron microscope (SEM) image of the cross-section of a membrane according to Example 1 with 250× magnification.

Figure 2:
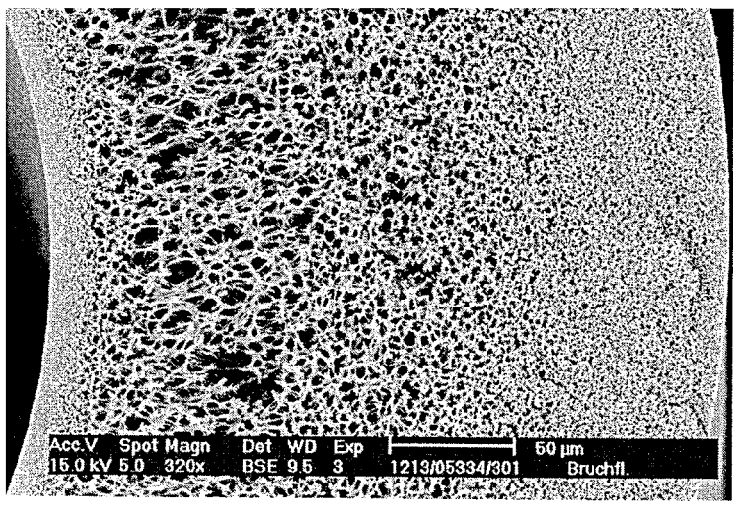

FIG. 2: is a scanning electron microscope (SEM) image of the cross-section of a membrane according to Example 3 with 320× magnification.

In the examples, the following methods were employed for characterisation of the membranes obtained:

Transmembrane Flow (Water Permeability):

A test cell with a defined number of hollow fibres and length is produced from the hollow-fibre membranes to be tested. For this, both ends of the hollow fibres are embedded in a polyurethane resin. After setting of the resin, the embeddings are cut to a length of approx. 30 mm with the lumina of the hollow-fibre membranes being opened by the cut. The hollow-fibre lumina in the embeddings must be checked for free passage. The free length of the hollow-fibre membranes between the embeddings is normally 120+/−10 mm. The number of hollow-fibre membranes must be such that, allowing for the free length and inside diameter of the hollow-fibre membranes, a filtration surface area of approx. 30 cm² is provided in the test cell.

The test cell is integrated into a test apparatus through which ultrafiltrated and deionised water conditioned to 25° C. flows with a defined test pressure (approx. 0.4 bar). The filtrated water volume obtained over a measuring time of 2 minutes, i.e. the permeate produced during the measurement, is determined gravimetrically or volumetrically. Before the start of the measurement, the system must be purged air-free. In order to determine the TMF, the inlet and outlet pressure at the test cell are measured in the test apparatus. The measurement is performed at 25° C.

The transmembrane flow TMF is calculated using formula (III)

$$TMF = \frac{V_W}{\Delta t \cdot A_M \cdot \Delta p} \left[ \frac{ml}{cm^2 \cdot min \cdot bar} \right] \quad (III)$$

where:
$V_W$=Water volume flowing through the membrane sample during the measuring time [ml]
$\Delta t$=Measuring time [min]
$A_M$=Area of the membrane sample exposed to the flow (normally 30 cm²)
$\Delta p$=Pressure set during the measurement [bar]

Characterisation of the Cutoff by Determination of the Retention Capacity for dextran molecules of different molar mass A polydisperse aqueous dextran solution (pool) flows in crossflow mode toward the membrane to be characterised. A defined wall shear rate and a defined filtrate flow density through the membrane is set. The content of dextran molecules of different molar mass MW in the filtrate flow or pool is determined by means of gel permeation chromatography (GPC).

The GPC spectrum of the pool or filtrate is thereby divided into 40 equidistant sections whose area is determined by numerical integration. A molar mass is assigned to each of these time intervals according to the calibration spectrum that is determined using monodisperse dextran molecules of known molar mass. The sieving coefficient of the membrane compared with dextran molecules of the molar mass MW is obtained by forming the ratio of the area segments of the GPC spectra of the filtrate and the pool assigned to this molar mass.

$$SK_{MW} = \frac{Area\ (MW, permeate)}{Area\ (MW, pool)} \quad (IV)$$

$$Retention = (1 - SK) \cdot 100 [\%] \quad (V)$$

The retention coefficient $R_{MW}$ for dextran molecules of the molar mass MW is calculated as follows:

$$R_{MW} = 1 - SK_{MW} \quad (VI)$$

Since the determined retention profile is highly dependent on the test conditions (concentration polarisation), the filtrate flow density and wall shear rate must be clearly defined when determining the retention profile. For a hollow-fibre membrane module of length l containing n hollow-fibre membranes, filtrate flow density $Q_F$ and axial volumetric flow $Q_L$ are calculated as follows:

$$Q_L = \frac{n \cdot d^3 \cdot Y_W}{1.69 \cdot 10^{11}} \quad (VII)$$

$Y_W$: Wall shear rate=2000/s
d: Inside diameter of the hollow-fibre membranes [µm]
n: Number of hollow-fibre membranes in the membrane module
$Q_L$: Axial volumetric flow in the lumen of the hollow-fibre membranes [ml/min]

$$Q_F = n \cdot \pi \cdot d \cdot l \cdot V_L \cdot 10^{-9} \quad (VIII)$$

$Q_F$: Filtrate flow rate [ml/min]
l: Free length of the hollow-fibre membrane in the membrane module [cm]
$V_L$: Velocity in the lumen [cm/min] ($V_L = 4 \cdot 10^8 \cdot Q_L/(n \cdot \pi \cdot d^2)$)
n: Number of hollow fibres in the membrane module Composition of the dextran solution employed (manufacturer: Pharmacia Biotech; article designations: T10, T40, T70, T500)

| Dextran type: | T10 | T40 | T70 | T500 |
|---|---|---|---|---|
| Weight: | 0.64 g/l | 0.90 g/l | 0.4 g/l | 0.66 g/l |

The solutions are mixed with deionised water.

Breaking Force, Breaking Strength

The breaking force of the hollow-fibre membranes is measured using a standard universal testing machine from Zwick, Ulm.

The hollow-fibre membrane sample is drawn at constant speed in the longitudinal direction until it breaks. The force required is measured in relation to the change in length and recorded in a force/elongation diagram. The measurement is performed as a multiple determination on several hollow-fibre membrane samples with 100 mm clamped length and at a drawing speed of 500 mm/min. The pretension weight is 2.5 cN. The force BK required for the break is output as a mean numerical value in cN.

The breaking strength $\sigma_B$ of the hollow-fibre membrane sample is obtained by standardisation of the breaking force BK to the cross-sectional area $A_Q$ of the membrane wall.

Bursting Pressure

An approx. 40 cm long hollow-fibre membrane sample is formed as a loop with its ends embedded e.g. in polyurethane resin.

The membrane is wetted on the lumen side with a test liquid of 1.5 g/l methyl cellulose in water in order to fill the pores of the membrane while maintaining the pore structure. This makes the membrane walls impermeable to gas. Nitrogen is then admitted to the lumen side of the hollow-fibre membrane sample, whereby a linear increase in pressure (2 bar/min) is generated at the sample using a pressure booster station, throttle valve and high-pressure reservoir.

The pressure at the inlet to the sample is measured and documented on a plotter. The pressure is increased until the membrane sample bursts. When the membrane sample bursts or explodes, the pressure at the test cell drops suddenly. The pressure at the reversing point of the pressure increase is read off as the bursting pressure.

EXAMPLE 1

In order to produce a homogeneous spinning solution,
21.00 wt. % polyether sulfone (Ultrason E 6020, BASF),
12.60 wt. % polyvinylpyrrolidone (PVP K30, ISP),
31.54 wt. % ε-caprolactam,
31.54 wt. % γ-butyrolactone and
3.32 wt. % glycerine
were intensively mixed at a temperature of approx. 100° C. The resulting solution was cooled to approx. 60° C., degassed, filtered and conveyed to the annular gap of a hollow-fibre die maintained at 35° C. with a gap width of 0.24 mm and an inside diameter of the die needle of 0.6 mm. For the formation of the lumen and the lumen-side separating layer, an interior filler consisting of ε-caprolactam/glycerine/water in the ratio of 47:37:16 by weight was extruded through the needle of the hollow-fibre die. The hollow fibre formed was conducted through a conditioned climate-controlled channel (climate: 60° C.; 60% relative humidity, t=4 s), precipitated in a precipitation bath containing water conditioned to approx. 70° C., and the membrane structure fixed. Immediately after fixing, the wet membrane was made up to approx. 1 m long hollow-fibre membrane bundles with approx. 900 hollow fibres, extracted for 3 hours with approx. 90° C. hot water and subsequently dried for approx. 2 hours with 90° C. hot air. The hollow-fibre membranes contained in the bundles had a lumen diameter of approx. 0.75 mm and a wall thickness of approx. 0.22 mm.

The membrane exhibited a transmembrane flow in water $TMF_W$ of 1.28 ml/(cm$^2$·min·bar). A cutoff of approx. 62 000 daltons was determined from the separation curve obtained with dextrans. In the tensile test, the membranes showed a breaking force of 510 cN, corresponding to a breaking strength of approx. 760 cN/mm$^2$. The resulting product of the transmembrane flow and breaking force determined in this manner was 653 cN·ml/(cm$^2$·min·bar). The bursting pressure of the hollow-fibre membranes in this example was 15.75 bar.

The examination under the scanning electron microscope showed the membrane to have a separating layer with a thickness of approx. 6 μm on its lumen side, that was adjoined towards the outside by an approx. 160 to 170 μm thick supporting layer, within which the size of the pores increased sharply starting from the separating layer up to a zone with maximum pore size at approx. 20 to 25% of the wall thickness, and after passing through the maximum decreased towards the outside up to an outer layer. The supporting layer was adjoined by the outer layer with a thickness of approx. 50 μm, within which an essentially isotropic pore structure, i.e. an essentially constant pore size, prevailed. FIG. 1 shows an SEM image of the hollow-fibre membrane according to Example 1.

EXAMPLE 2

In order to produce a homogeneous spinning solution,
19.46 wt. % polyether sulfone (Ultrason E 6020, BASF),
13.65 wt. % polyvinylpyrrolidone (PVP K30, ISP),
31.91 wt. % ε-caprolactam,
31.61 wt. % γ-butyrolactone and
3.37 wt. % glycerine
were intensively mixed at a temperature of approx. 100° C. The resulting solution was cooled to approx. 60° C., degassed, filtered and conveyed to the annular gap of a hollow-fibre die maintained at 35° C. with a gap width of 0.16 mm and an inside diameter of the die needle of 0.6 mm. For the formation of the lumen and the lumen-side separating layer, an interior filler consisting of ε-caprolactam/glycerine/water in the ratio of 45:37:18 by weight was extruded through the needle of the hollow-fibre die. The hollow fibre formed was conducted through a conditioned climate-controlled channel (climate: 60° C.; 60% relative humidity, t=4 s), precipitated in a precipitation bath containing water conditioned to approx. 75° C., and the membrane structure fixed. Immediately after fixing, the wet membrane was made up to approx. 1 m long hollow-fibre membrane bundles with approx. 900 hollow fibres, extracted for 3 hours with approx. 90° C. hot water and subsequently dried for approx. 2 hours with 90° C. hot air. The hollow-fibre membranes had a lumen diameter of approx. 0.70 mm and a wall thickness of approx. 0.15 mm.

The membranes exhibited a transmembrane flow in water $TMF_W$ of 1.36 ml/(cm$^2$·min·bar). A cutoff of approx. 71 000 daltons was determined from the separation curve obtained with dextrans. In the tensile test, the membranes showed a breaking force of 253 cN, corresponding to a breaking strength of approx. 633 cN/mm$^2$. The bursting pressure of the hollow-fibre membranes in this example was 11.5 bar.

The examination under the scanning electron microscope showed the membrane to have a separating layer with a thickness of approx. 6 μm on its lumen side, that was adjoined towards the outside by a supporting layer within which the size of the pores increased starting from the separating layer up to a zone with maximum pore size at approx. 25 to 30% of the wall thickness, and after passing through the maximum decreased towards the outside up to an outer layer. The pores in the zone of maximum pore size were smaller in the hollow-fibre membrane in Example 2 than in the hollow-fibre membrane produced according to Example 1. The supporting layer was adjoined by the outer layer with essentially isotropic pore structure, i.e. an essentially constant pore size, and a thickness of approx. 45 μm.

EXAMPLE 3

In order to produce a homogeneous spinning solution,
21.00 wt. % polyether sulfone (Ultrason E 6020, BASF),
12.60 wt. % polyvinylpyrrolidone (PVP K30, ISP),
31.54 wt. % ε-caprolactam,
31.54 wt. % γ-butyrolactone and
3.32 wt. % glycerine
were intensively mixed at a temperature of approx. 110° C. The resulting solution was cooled to approx. 40° C., degassed, filtered and conveyed to the annular gap of a hollow-fibre die maintained at 35° C. with a gap width of 0.24 mm and an inside diameter of the die needle of 0.6 mm. For the formation of the lumen and the lumen-side separating layer, an interior filler consisting of ε-caprolactam/glycerine/water in the ratio of 45:37:18 by weight was extruded through the needle of the hollow-fibre die. The hollow fibre formed was conducted through a conditioned climate-controlled channel (climate: 70° C.; 85% relative humidity, t=2.6 s), precipitated in a precipitation bath containing water conditioned to approx. 66° C., and the membrane structure fixed. Immediately after fixing, the wet membrane was made up to approx. 1 m long hollow-fibre membrane bundles with approx. 900 hollow fibres, extracted for 3 hours with approx. 90° C. hot water and subsequently dried for approx. 2 hours with 90° C. hot air. The hollow-fibre membranes contained in the bundles had a lumen diameter of approx. 0.78 mm and a wall thickness of approx. 0.22 mm.

The membrane exhibited a transmembrane flow in water $TMF_W$ of 1.76 ml/(cm²·min·bar). A cutoff of approx. 185 000 daltons was determined from the separation curve obtained with dextrans. In the tensile test, the membranes showed a breaking force of 502 cN, corresponding to a breaking strength of approx. 730 cN/mm². The resulting product of the transmembrane flow and breaking force determined in this manner was 1070 cN·ml/(cm²·min·bar).

The membrane had a separating layer with a thickness of approx. 8 µm on its lumen side, that was adjoined towards the outside by an approx. 180 to 190 µm thick supporting layer, within which the size of the pores increased sharply starting from the separating layer up to a zone with maximum pore size at approx. 20% of the wall thickness, and after passing through the maximum decreased towards the outside up to an outer layer. The supporting layer was adjoined by the outer layer with a thickness of approx. 25 µm, within which an essentially isotropic pore structure, i.e. an essentially constant pore size, prevailed. FIG. 2 shows an SEM image of the cross-section of the wall of the hollow-fibre membrane according to Example 3.

COMPARISON EXAMPLE 1

A homogeneous spinning solution was produced from 19.5 wt. % polyether sulfone (Ultrason E 6020, BASF) and 13.65 wt. % polyvinylpyrrolidone (PVP K30, ISP) in 31.75 wt. % ε-caprolactam, 31.75 wt. % γ-butyrolactone and 3.35 wt. % glycerine by intensive mixing at a temperature of approx. 100° C. The solution obtained was cooled to approx. 60° C., degassed, filtered and conveyed to the annular gap of a hollow-fibre die maintained at 67° C. with a gap width of 0.05 mm and an inside diameter of the die needle of 0.15 mm. For the formation of the lumen and the inner separating layer, an interior filler consisting of ε-caprolactam/glycerine/water in the ratio of 43:41:16 by weight was extruded through the needle of the hollow-fibre die. The hollow fibre formed was conducted through a conditioned climate-controlled channel (climate: 55° C.; 80% relative humidity, t=1 s), and then precipitated and fixed by means of the interior filler and by passing through a bath containing water at approx. 64° C. The hollow-fibre membrane thus obtained was subsequently washed with approx. 90° C. hot water and dried. The resulting hollow-fibre membrane exhibited a lumen diameter of approx. 0.2 mm and a wall thickness of approx. 0.03 mm.

The membrane had a transmembrane flow in water $TMF_w$ of 0.4 ml/(cm²·min·bar). A cutoff of approx. 59 000 daltons was determined from the separation curve obtained with dextrans. In the tensile test, the membranes showed a breaking force of 19.5 cN, corresponding to a breaking strength of approx. 180 cN/mm².

The examination under the scanning electron microscope showed the membrane to have a separating layer with a thickness of approx. 2 µm on its lumen side, that was adjoined towards the outside by a supporting layer within which the size of the pores increased, starting from the separating layer up to a zone with maximum pore size, and after passing through the maximum decreased towards the outside. The transition from the supporting layer into the outer layer was more or less continuous, whereby a further decrease in the pore sizes was observed within the outer layer.

The invention claimed is:

1. A hydrophilic, integrally asymmetric, semi-permeable hollow-fibre membrane for ultrafiltration made from a hydrophobic aromatic sulfone polymer and at least one hydrophilic polymer, the membrane exhibiting an inner surface facing towards its lumen, an outer surface facing outwards and an intermediate wall with a wall thickness, whereby in its wall on the inner surface the hollow-fibre membrane has an open-pore separating layer, adjoining the separating layer towards the outer surface a subsequent supporting layer with asymmetric, sponge-like pore structure without finger pores and adjoining the supporting layer towards the outer surface an outer layer, characterised in that a. The separating layer has a cutoff in the range between 20,000 and 200,000 daltons and a thickness of no greater than 10% of the wall thickness and the pore structure in the area of the separating layer is essentially isotropic,
  b. The size of the pores in the supporting layer initially increases from the separating layer up to a zone with maximum pore size, then decreases beyond this zone towards the outer layer,
  c. The outer layer has a thickness of 10 to 25% of the wall thickness, the pore structure in the area of the outer layer is essentially isotropic and the mean size of the pores in the outer layer is larger than the mean pore size in the separating layer, but smaller than the mean pore size in the supporting layer,
  d. The wall thickness lies in the range from 100 to 450 µm, and
  e. The hollow-fibre membrane has a transmembrane flow for water of at least 0.5 ml/(cm²·min·bar) and a breaking strength $\sigma_B$ of at least 500 cN/mm², wherein the breaking strength $\sigma_B$ is defined as a breaking force BK of the membrane referred to the cross-sectional area $A_Q$ of the wall of the membrane.

2. The hollow-fibre membrane according to claim 1, characterised in that the zone with maximum pore size is located at a distance from the inner surface in the range between 15 and 40% of the wall thickness.

3. The hollow-fibre membrane according to claim 1, characterised in that the size of the maximum pores in the zone with maximum pore size lies in the range between 5 and 15 µm.

4. The hollow-fibre membrane according to claim 1, characterised in that it has a transmembrane flow for water in the range of 0.5 to 2.0 ml/(cm²·min·bar).

5. The hollow-fibre membrane according to claim 1, characterised in that the product TMF·BK of the transmembrane flow TMF for water and the breaking force BK of the hollow-fibre membrane is larger than 400 cN·ml/(cm²·min·bar).

6. The hollow-fibre membrane according to claim 5, characterised in that the product TMF·BK is larger than 500 cN·ml(cm²·min·bar).

7. The hollow-fibre membrane according to claim 1, characterised by the breaking strength $\sigma_B$ being at least 700 cN/mm².

8. The hollow-fibre membrane according to claim 1, characterised in that the separating layer has a cutoff in the range between 50,000 and 150,000 daltons.

9. The hollow-fibre membrane according to claim 1, characterised in that the wall thickness lies in the range from 150 to 350 µm.

10. The hollow-fibre membrane according to claim 1, characterised in that the hydrophobic aromatic sulfone polymer is a polysulfone or polyether sulfone.

11. The hollow-fibre membrane according to claim 1, characterised in that the at least one hydrophilic further polymer has a mean molecular weight Mw of more than 10,000 daltons.

12. The hollow-fibre membrane according to claim 1, characterised in that the at least one hydrophilic polymer comprises a polyvinylpyrrolidone or a polyethylene glycol.

13. The hollow-fibre membrane according to claim 1, characterised in that the at least one hydrophilic polymer comprises a polyvinylpyrrolidone or a polyethylene glycol and a hydrophilically modified aromatic sulfone polymer.

14. The hollow-fibre membrane according to claim 13, characterised in that the hydrophilically modified aromatic sulfone polymer is a sulfonated aromatic sulfone polymer.

15. The hollow-fibre membrane according to claim 1, characterised in that it has a volume porosity in the range from 70 to 85 vol. %.

16. A method for production of a hollow-fibre membrane according to claim 1, whereby the method comprises the steps:
  a. Production of a homogeneous spinning solution comprising a polymer component and a solvent system, whereby the polymer component comprises 17 to 27 wt. %, referred to the weight of the solution, of a hydrophobic aromatic sulfone polymer and 10 to 30 wt. %, referred to the weight of the solution, of at least one hydrophilic polymer, while the solvent system consists of 5 to 80 wt. %, referred to the weight of the solvent system, of a solvent for the polymer component, 0 to 80 wt. %, referred to the weight of the solvent system, of a latent solvent for the polymer component and 0 to 70 wt. %, referred to the weight of the solvent system, of a non-solvent for the polymer component,
  b. Extrusion of the homogeneous spinning solution through the annular gap of a hollow-fibre die to produce a hollow fibre,
  c. Extrusion of an interior filler through the central opening of the hollow-fibre die, said interior filler consisting of a mixture of a solvent and a non-solvent for the sulfone polymer,
  d. Bringing of the interior filler into contact with the inside of the hollow fibre to initiate the coagulation inside the hollow fibre and to form a separating layer on the inside of the hollow fibre,
  e. Passage of the hollow fibre after leaving the hollow-fibre die for a period of 0.5 to 10 s through a climate-controlled zone containing air with a relative humidity of 40 to 95% and a temperature of 50 to 70° C., subsequently
  f. Passage of the hollow fibre through an aqueous coagulation medium conditioned to 50 to 80° C. to complete the formation of the membrane structure and to fix the membrane structure,
  g. Extraction of the hollow-fibre membrane formed in this way to remove the solvent system and soluble substances,
  h. Drying of the hollow-fibre membrane.

17. The method according to claim 16, charactrised in that the hydrophobic aromatic sulfone polymer is a polysulfone or polyether sulfone.

18. The method according to claim 16, characterised in that the at least one hydrophilic polymer comprises a polyvinylpyrrolidone or a polyethylene glycol.

19. The method according to claim 16, characterised in that the at least one hydrophilic polymer comprises a polyvinylpyrrolidone or a polyethylene glycol and a hydrophilically modified aromatic sulfone polymer.

20. The method according to claim 16, characterised in that the solvent system contains ε-caprolactam as a solvent.

21. The method according to claim 20, characterised in that the solvent system contains 35 to 50 wt. % ε-caprolactam referred to the weight of the solvent system, 35 to 50 wt. % γ-butyrolactone referred to the weight of the solvent system, and 0 to 10 wt. % of a non-solvent for the polymer component, referred to the weight of the solvent system.

22. The method according to claim 20, characterised in that a mixture of glycerine and ε-caprolactam is employed as the interior filler.

23. The method according to claim 16, characterised in that the air contained in the climate-controlled zone has a relative humidity of 55 to 85%.

24. The method according to claim 16, characterised in that the air contained in the climate-controlled zone flows through the climate-controlled zone with a velocity of less than 0.5 m/s.

25. The method according to claim 16, characterised in that the aqueous coagulation medium is conditioned to 60 to 75° C.

* * * * *